(12) United States Patent
Arai

(10) Patent No.: US 7,280,037 B2
(45) Date of Patent: Oct. 9, 2007

(54) ALARM DISPLAY SYSTEM FOR VEHICLES

(75) Inventor: Masatoshi Arai, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 204 days.

(21) Appl. No.: 11/221,969

(22) Filed: Sep. 9, 2005

(65) Prior Publication Data
US 2006/0049927 A1 Mar. 9, 2006

(30) Foreign Application Priority Data
Sep. 9, 2004 (JP) ............................. 2004-262925

(51) Int. Cl.
B60Q 1/00 (2006.01)
G08G 1/123 (2006.01)
(52) U.S. Cl. .................. 340/438; 340/988; 340/995.2
(58) Field of Classification Search ................ 340/438, 340/425.5, 457, 475, 988, 995.1, 995.15, 340/995.17, 995.19, 995.2; 701/200, 211, 701/212, 1
See application file for complete search history.

(56) References Cited

U.S. PATENT DOCUMENTS 4,670,744 A * 6/1987 Buzak ............................ 345/6
6,499,852 B1 * 12/2002 Kino et al. .................... 362/23
6,674,578 B2 * 1/2004 Sugiyama et al. ........... 359/631

FOREIGN PATENT DOCUMENTS

| JP | 61-211139 A | 9/1986 |
| JP | 07-032912 A | 2/1995 |
| JP | 09-325692 A | 12/1997 |
| JP | 2004-132998 A | 4/2004 |

* cited by examiner

Primary Examiner—Toan N. Pham
(74) Attorney, Agent, or Firm—Foley & Lardner LLP

(57) ABSTRACT

A display has a panel display unit with plural display screen portions arranged along a longitudinal direction of a vehicle body and providing an alarm display on a screen, a multi-stage display unit with reflecting mirrors inclined with respect to the screen portions and arranged at intervals along the longitudinal direction so as to respectively correspond with the screen portions and reflect the alarm display, and an alarm-distance obtaining unit for obtaining an alarm-distance between a present vehicle-position and an alarm-object position. The reflecting mirrors includes a most-rear reflecting mirror and at least one front reflecting mirror through which the alarm display can be seen. A multistage display control unit controls the display unit such that the alarm display is linked to the alarm-distance and provided in display-screen-portion order thereon so as to obtain a deep multistage alarm display.

18 Claims, 6 Drawing Sheets

FIG. 5

| Di | Threshold value (a distance for a display on the i-th display screen) |
|---|---|
| D3 | 200m (a distance for a display on the 3rd display screen 7h) |
| D2 | 100m (a distance for a display on the 2nd display screen 7g) |
| D1 | 20m (a distance for a display on the 1st display screen 7f) |

FIG. 7

| Di | Threshold value (a distance for a display on the i-th display screen) |
|---|---|
| D3 | 70m (a distance for a display on the 3rd display screen 7h) |
| D2 | 40m (a distance for a display on the 2nd display screen 7g) |
| D1 | 20m (a distance for a display on the 1st display screen 7f) |

ALARM DISPLAY SYSTEM FOR VEHICLES

BACKGROUND OF THE INVENTION

1. Field of the Invention

The present invention relates to an alarm display system for vehicles which is mounted on vehicles, such as motor vehicles, boats and ships, and aircrafts, for providing a deep display image including alarm information on a display screen.

2. Description of the Related Art

A display device of a navigation system capable of displaying a deep image is disclosed in Japanese patent laying-open publication No. (Tokkaihei) 9-325692, and provides on its flat display screen with a deep display image of a road map obtained by transforming a square-shaped map into a trapezoid-shaped map such that an area nearer to a user becomes longer in horizontal and vertical directions than a farther area.

The above known conventional display device, however, encounters problems that the display image is distorted due to the transformation and a display screen becomes larger in its area, especially longer in its vertical direction, in order to obtain a sufficiently deep display image.

In addition, it is not suitable for raising an alarm for an alarm object ahead such that a user can know a position of the object by watching a trapezoidal display image.

It is, therefore, an object of the present invention to provide an alarm display system for vehicles which overcomes the foregoing drawbacks and can provide a not-distorted deep display image on a display screen that is smaller in area than that of the conventional display unit, enabling a user to easily recognize a position of an alarm object.

SUMMARY OF THE INVENTION

According to a first aspect of the present invention there is provided an alarm display system for vehicles comprising: a panel display unit that has a plurality of display screen portions arranged along a longitudinal direction of a vehicle body and is capable of providing an alarm display on a screen of the display screen portions; a multistage display unit having a plurality of reflecting mirrors that are inclined with respect to the display screen portions and arranged at intervals along the longitudinal direction so as to respectively correspond with the display screen portions and be capable of reflecting the alarm display, the reflecting mirrors including a most-rear reflecting mirror and at least one front reflecting mirror through which the alarm display can be seen; an alarm-distance obtaining unit that obtains an alarm-distance between a present vehicle-position and a position of an alarm object; and a multistage display control unit that controls the multistage display unit such that the alarm display is provided in order of the display screen portions thereon, being linked to the alarm-distance so as to obtain a deep multistage alarm display.

BRIEF DESCRIPTION OF THE DRAWINGS

The objects, features and advantages of the present invention will become apparent as the description proceeds when taken in conjunction with the accompanying drawings, in which:

FIG. 5 is a table illustrating threshold values which are distances for a display on a first to third display screen portions, respectively, used in the alarm display system of the first embodiment;

FIG. 7 is a table illustrating threshold values which are distances for a display on a first to third display screen portions, respectively, used in the alarm display system of the second embodiment.

DETAILED DESCRIPTION OF THE PREFERRED EMBODIMENTS

Figure 1:
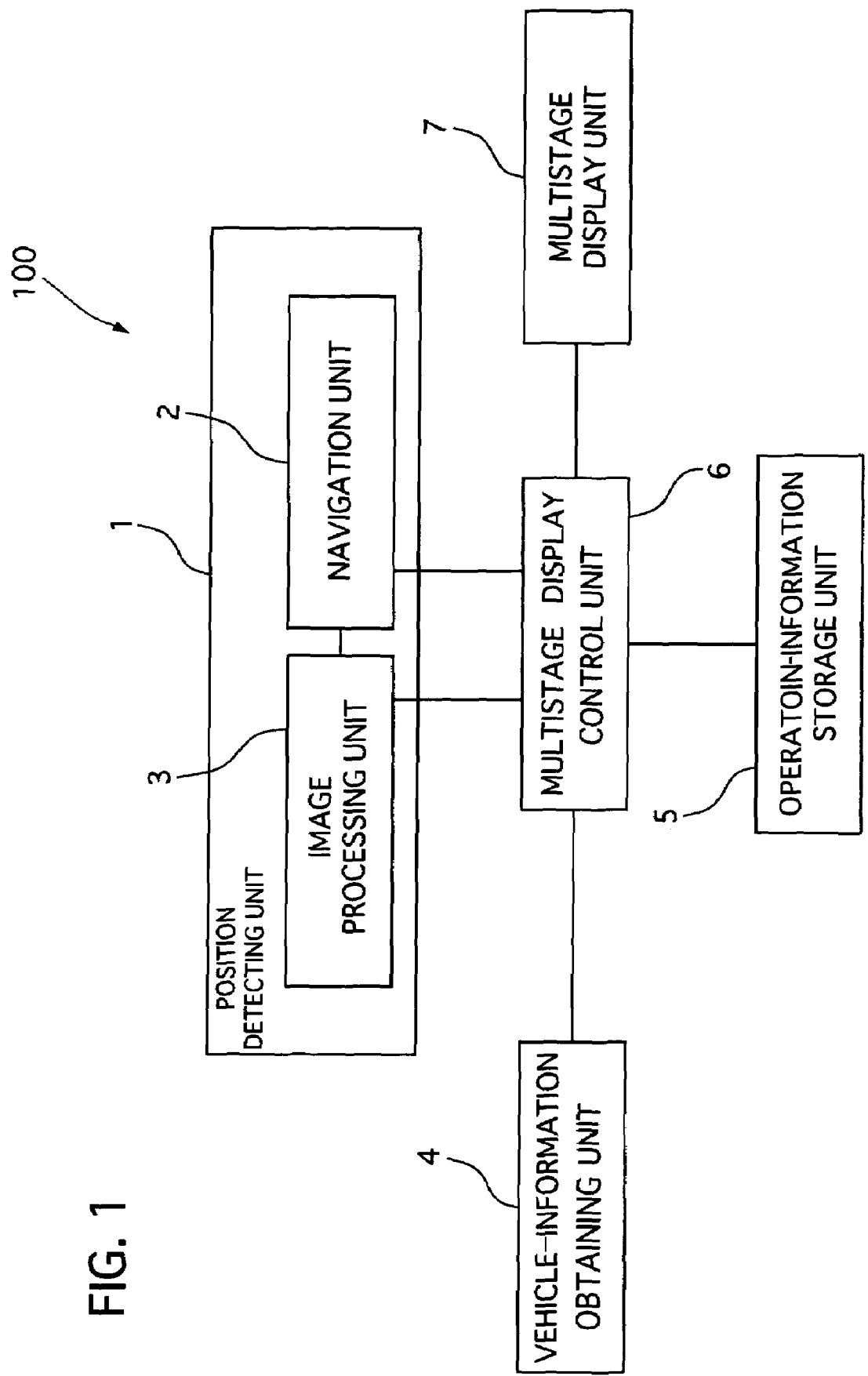
FIG. 1 is a schematic diagram showing an alarm display system of a first embodiment according to the present invention.

Throughout the following detailed description, similar reference characters and numbers refer to similar elements in all figures of the drawings, and their descriptions are omitted for eliminating duplication.

Referring to FIG. 1 of the drawings, there is shown a first preferred embodiment of an alarm display system for vehicles according to the present invention.

The alarm display system 100 includes an alarm-distance obtaining unit 1, a vehicle-information obtaining unit 4, an operation-information storage unit 5, a multistage display control unit 6, and a multistage display unit 7.

The alarm-distance obtaining unit 1 has a navigation unit 2 and an image processing unit 3 and detects an alarm-distance (D) between a present vehicle-position ($P_P$) of a motor vehicle which a user drives and an alarm position such as a turn position ($P_C$) for the vehicle to turn next on, and outputs an alarm-distance signal.

Figure 2:
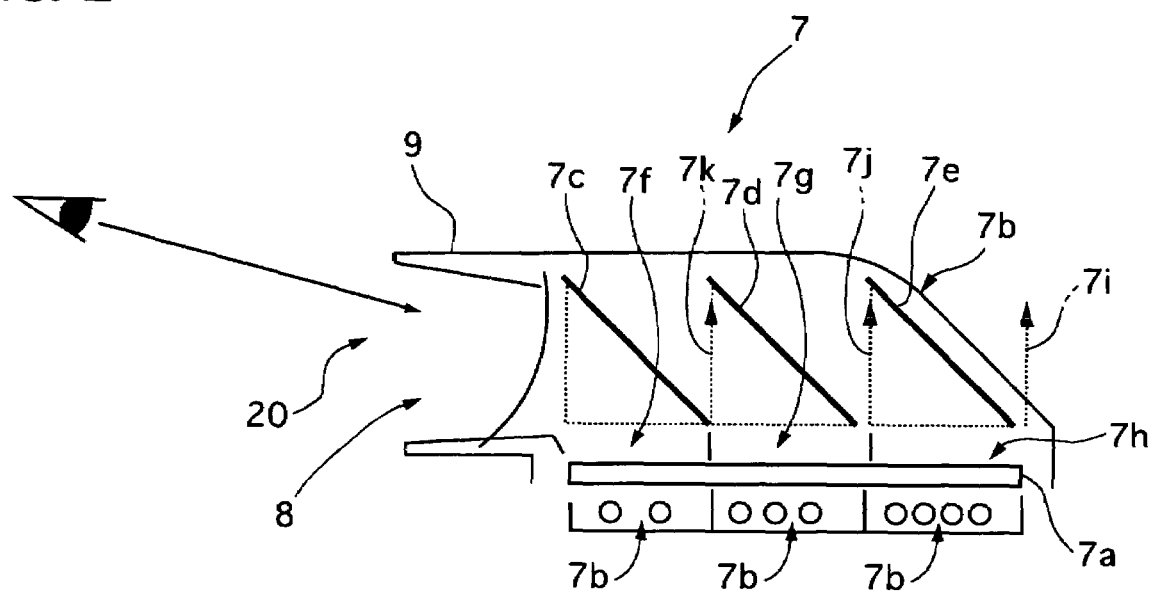
FIG. 2 is a schematic cross-sectional side view of a multistage display unit used in the alarm display system of the first embodiment shown in FIG. 1.

The navigation unit 2 is installed in a central portion, in a latitudinal direction of a vehicle body, of an instrument panel 8 shown in FIG. 2, and detects the present position by using a Global Positioning System (GPS) and/or a gyroscope to output a present vehicle-position signal, and provides a road-guidance information to a destination with road information adjacent to the present position of the vehicle by using a map information contained in a CD-ROM or a DVD. The road-guidance information is used to guide the vehicle to its destination and includes an arrow mark, which indicates a direction where the vehicle is to run. The navigation unit 2 also provides the alarm-distance based on the present position and the road information.

The image processing unit 3 is equipped with a not-shown stereo camera, a charge-coupled device (CCD) camera for example, which is attached to a front portion of a vehicle body, and is electrically connected to the navigation unit 2 to function in conjunction with the navigation unit 2 so as to detect an alarm-distance between the present position of the vehicle and a position of an alarm object that the stereo camera captures so to collate this alarm-distance with the alarm-distance obtained by the navigation unit 2. The alarm object captured by the camera is a road traffic sign for example, and the image processing unit 3 identifies what is the traffic sign. The image processing unit 3 outputs a sign signal when it detects at least a halt-indicator line on a road.

The vehicle-information obtaining unit 4 obtains vehicle information including driver-operation information and vehicle-operation signal. The drive-operation information contains at least brake-pedal-operation information and turn-signal-lever-operation information obtained from a Control Area Network (CAN) provided on the vehicle, and it is outputted from the vehicle-information obtaining unit 4 as a driver-operation information signal. The vehicle-operation information contains information such as a vehicle speed and an engine speed obtained from a vehicle-speed sensor, an engine-speed sensor, and the like, and it is outputted from the vehicle-information obtaining unit 4 as a vehicle-operation information signal. The driver-operation signal and the vehicle-operation signal correspond to a vehicle information signal.

The operation-information storage unit 5 receives the present vehicle-position signal outputted from the navigation unit 2 and the vehicle signal outputted from the vehicle-information obtaining unit 4 and stores historical operation data including driver's operation information on a driver's inherent driving skill and driving inclination. This information concerns, for example, relevant information relating timing (distance or time) information, based on the driver-operation information, on an operation of a turn-over lever and/or a brake pedal when a driver turns or stops his or her vehicle to the vehicle-operation information obtained at this operating time. The operation-information storage unit 5 outputs a historical operation data signal determined based on the historical operation data to the multistage display control unit 6.

The multistage display control unit 6 is electrically connected to the navigation unit 2, the image processing unit 3, the vehicle-information obtaining unit 4, and the operation-information storage unit 5 to receive the present vehicle signal, the sign signal, the vehicle signal, and the historical operation data signal, respectively. It processes the signals so as to perform multistage display control for producing a multistage display image, which will be described in detail later, and outputs a multistage display control signal.

The multistage display unit 7 is electrically connected to the multistage display control unit 6 to receive the multistage display control signal and provides a multistage display image for a user.

Referring to FIG. 2, the multistage display unit 7 is installed in an instrument panel hood 9 of the central portion of a driver's side portion of the instrument panel 8 and equipped with a liquid crystal display (LCD) 7a, a plurality of backlights 7b, first and second half mirrors 7c and 7d, and a full mirror 7e. The LCD 7a acts as a panel display unit of the present invention, and the half mirrors 7c and 7d and the full mirror 7e act as a reflecting mirror member of the present invention.

The LCD 7a is placed such that its screen is turned up and has a first to third display screen portions 7f, 7g, and 7h arranged along a longitudinal direction of the vehicle body.

The backlights 7b are placed under the LCD 7a so as to project light upward toward an under surface of the LCD 7a. Their brightness is set higher as a position of the backlight 7b becomes deeper.

The half mirrors 7c and 7d and the full mirror 7e are installed in an inclined state at even intervals along the longitudinal direction. Specifically, the full mirror 7e is placed over the third display screen portion 7h of the LCD 7a and inclined by a predetermined angle, 45 degrees in this embodiment, with respect to the third display screen portion 7h in a state that its bottom portion is positioned at the most rear side of the third display screen portion 7h and its upper portion is positioned at a front side thereof so that a display image on the third display screen portion 7h can be seen by the driver as a third virtual image 7i.

The second half mirror 7d is placed at the front of the full mirror 7e and over the second display screen portion 7g of the LCD 7a and inclined by a predetermined angle, 45 degrees in this embodiment, with respect to the second display screen portion 7g in a state that its bottom portion is positioned at the most rear side of the second display screen portion 7g and its upper portion is positioned at a front side thereof so that an display image on the second display screen portion 7g can be seen by the driver as a second virtual image 7j and the third virtual image 7i can also be seen by the driver through the second half mirror 7d.

The first half mirror 7c is placed at the front of the second half mirror 7d and over the first display screen portion 7f of the LCD 7a and inclined by a predetermined angle, 45 degrees in this embodiment, with respect to the first display screen portion 7f in a state that its bottom portion is positioned at the most rear side of the first display screen portion 7f and its upper portion is positioned at a front side thereof so that a display image on the first display screen portion 7f can be seen by the driver as a first virtual image 7k and the virtual image 7i can also be seen by the driver through the first and second half mirrors 7c and 7d.

Figure 3:
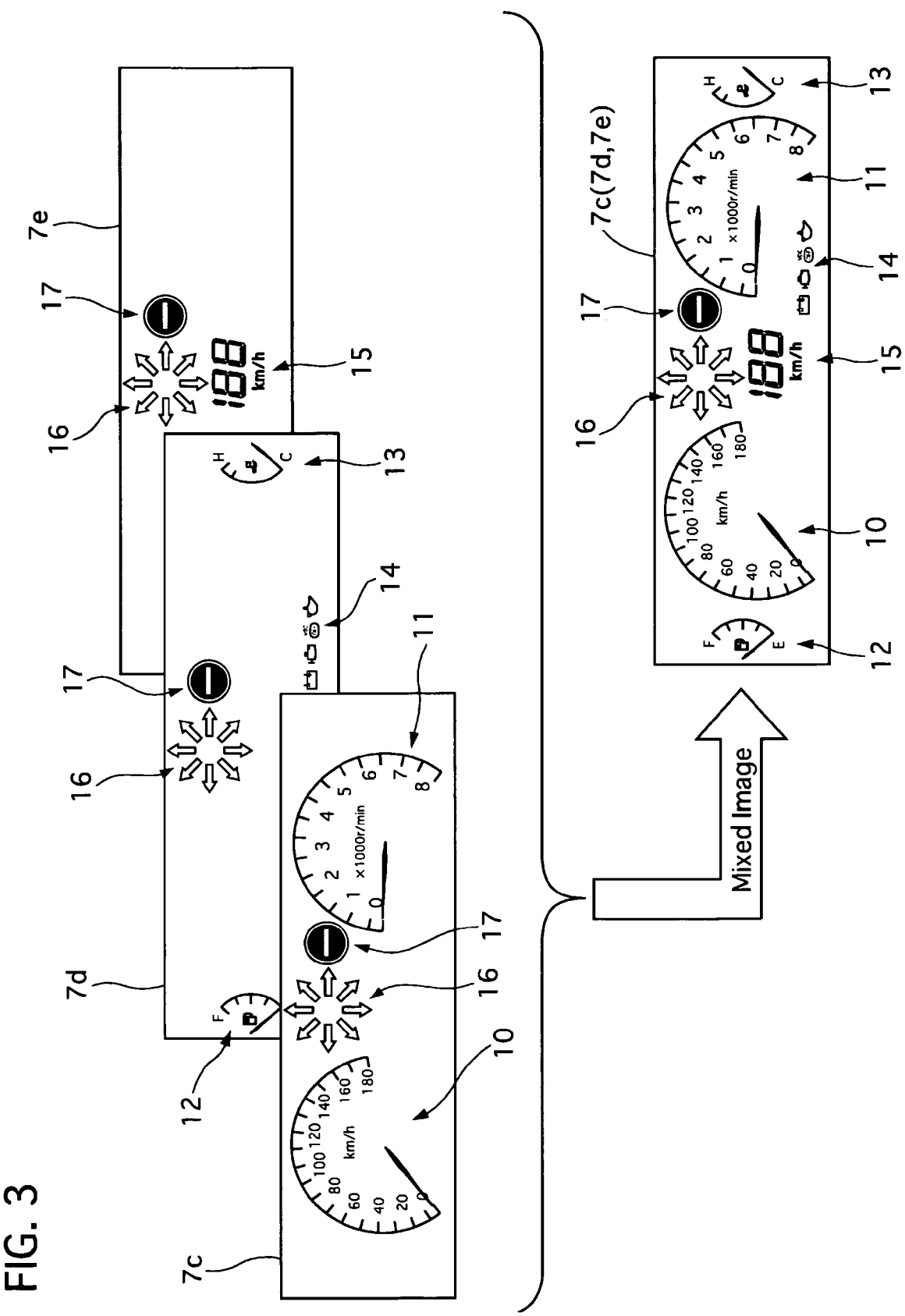
FIG. 3 is a schematic diagram showing three display images on a first to third display screen and a deep display image obtained by superposition of them, which are provided by the multistage display unit shown in FIGS. 1 and 2.

The above-constructed multistage display unit 7, as shown in an upper part of FIG. 3, can provide on the first display screen portion 7f of the LCD 7a with a display image of a vehicle-speedometer and an engine-revolution counter 11 as the first virtual image 7k. It can also provide on the second display screen portion 7g with a display image of a fuel gauge 12, a coolant temperature gauge 13, and various types of indicator lights 14 as the second virtual image 7j, which is located at a position where the first and second virtual images are prevented from an overlap between them. On the third display screen portion 7h, a display image of a digital vehicle-speed 15 can be provided at a position where it does not overlap with the display images on the second and third display screen portions 7f and 7g.

In addition, at a central portion of each display screen portion 7f, 7g, and 7h, a navigation arrow-mark (NA) 16 and a vehicle-stop mark 17 can be displayable under control, which will be described in detail later, by the multistage display control unit 6. Incidentally, the navigation arrow-mark 16 is illustrated so that it has eight different-directional arrows, but only one of them is displayed in the multistage display control.

Accordingly, the display image of a digital vehicle-speed 15 on the most-rear third display screen portion 7h enters a passenger compartment 20 as shown in FIG. 2 after being reflected on the full mirror 7e and passing through the first and second half mirrors 7c and 7d, which enables the driver to see its third virtual image 7i to be at a most rear position.

In addition, the display images of the fuel gauge 12, the coolant temperature gauge 13, and the various types of indicator lights 14 on the second display screen portion 7g enters the passenger compartment 20 after being reflected on the second half mirror 7d and passing through the first half mirror 7c, which enables the driver to see its second virtual image 7j to be in front of the third virtual image 7i.

Similarly, the display image of the vehicle-speedometer and the engine-revolution counter 11 enters the passenger compartment 20 after being reflected on the first half mirror 7c, which enables the driver to see its first virtual image 7k to be at a front-most position.

Therefore, the driver can see a deep display image, since the first to third virtual images 7i, 7j, and 7k are seen at positions different in the longitudinal direction from one another.

By shifting a display of the navigation arrow-mark 16 or the stop mark 17 on the first to third display screen portions 7f, 7g, and 7h in these order or in these reverse order, the driver can see the mark in such a way that it is going away in the former case and it is approaching in the later case. The mark is, namely, seen like it is going away when the display is shifted from on the first display screen portion 7f to on the third display screen portion 7h, while it is seen like it is approaching when the display is shifted from on the third display screen portion 7h to on the first display screen portion 7f.

Figure 4:
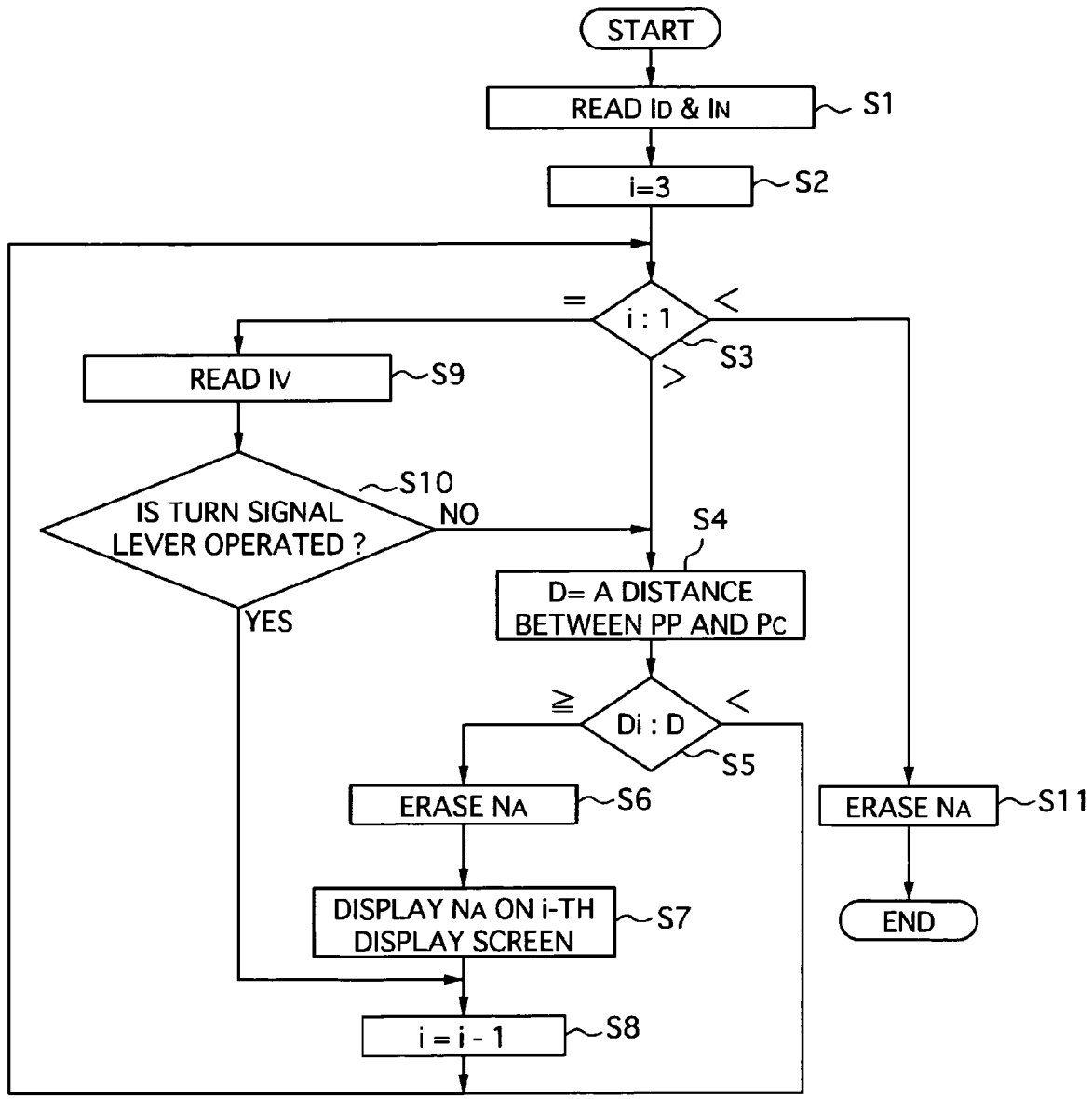
FIG. 4 is a flowchart of multistage display control, allowing for an operation of a turn signal lever, executed by the alarm display system of the first embodiments.

FIG. 4 shows a flowchart of the multistage display control executed in the alarm display system 100.

In this embodiment, the alarm object is a turn point for a vehicle to turn next, and the system 100 displays the navigation arrow-mark 16 for indicating a turn direction as an alarm display.

At step S1, the navigation unit 6 searches for a route to a destination which a driver inputs and sequentially computes an alarm-distance between a present vehicle-position of the vehicle and a turn position for the vehicle to turn next on with obtaining a navigation arrow-mark $N_A$ indicating a turn direction on the turn position, and the multistage display control unit 6 obtains information $I_D$ of the alarm-distance and information $I_N$ of the navigation arrow-mark. Then, the flow goes to step S2.

At the step S2, the multistage display control unit 6 sets i, the number of the display screen portions 7f, 7g, and 7h, to have a value of three, and then the flow goes to step 3.

At the step S3, the control unit 6 compares a value of i with one. If the value of i exceeds one, the flow goes to step S4, if the value of i is equal to one, the flow goes to step S9, and if the value of i is less than one, the flow goes to step S11.

At the step S4, a value of D is set to be the alarm-distance between a present vehicle-position and a turn position as a position of an alarm object, and then the flow goes to step S5.

At the step S5, a value of Di and a value of the D are compared to each other, where Di is a threshold value for determining an alarm-distance to display a navigation arrow mark 16 on an i-th display screen portion of the LCD 7 and set based on a table shown in FIG. 5 and driver-operation information outputted from the operation-information storage unit 5. This value of Di may be set by a driver. At this step S5, if Di is less than D, the steps S3 to S5 are repeated, while, if Di is equal to or more than D, the flow goes to step S6.

At the step S6, a navigation arrow-mark 16 displayed is erased when it is displayed on any one of the first to third display screen portions 7f, 7g, and 7h, and then the flow goes to step S7.

At the step S7, the navigation arrow-mark 16 obtained at step S1 is displayed on the i-th display screen portion of the LCD 7a, and then the flow goes to step S8.

At the step S8, the value of i is replaced by "i−1", and then the flow returns to the step S3.

On the other hand, when the value of i is equal to one, the flow goes to the step S9, where the multistage display control unit 6 receives a driver-operation signal and a vehicle-operation signal from the vehicle-information obtaining unit 4 to obtain vehicle-operation information Iv of brake-pedal operation, turn-signal-lever operation, vehicle-speed, and engine speed, and then the flow goes to step S10.

At the step S10, the multistage display control unit 6 judges whether or not the turn-signal-lever is operated. If YES, the flow goes to the step S8, while, if NO, the flow goes to the step S4.

When the value of i is less than one, the flow goes to step S11, where the navigation arrow-mark 16 is erased, and then a first control ends.

Although the multistage display control unit 6 judges the operation of the turn-signal-lever based on the driver-operation information including the turn-signal-lever-operation information at the step S10, the turn-signal-lever operation may be replaced by a brake-pedal operation or both of them.

The operation of the alarm display system 100 of the first embodiment will be described.

When a driver inputs his or her destination to the navigation unit 2 through a not-shown interface, it computes a present vehicle-position, an alarm-distance between the present vehicle-position and a turn position for a vehicle to turn next, and a turn direction of the vehicle, with producing a navigation arrow-mark based on the turn direction.

The multistage display control unit 6 obtains the alarm-distance and the navigation arrow-mark as shown in the steps S1 of FIG. 4 and sets i=1 as shown in the step S2.

For example, if the alarm-distance D is 400 m and the navigation arrow-mark 16 indicates a right turn, the steps S3 to S5 are repeated until the alarm-distance becomes 200 m (D3 in the table of FIG. 5). When the alarm-distance D becomes 200 m, the navigation arrow-mark 16 for indicating the right turn is displayed on the third display screen portion 7h, which enables the driver to see the mark 16 at a position of the most-rear third virtual image 7i.

Then, the steps S3 to S5 are repeated until the alarm-distance D becomes 100 m (D2 in the table of FIG. 5), and when it becomes 100 m, the navigation arrow-mark 16 on the third display screen portion 7h is erased and the similar navigation arrow-mark 16 for indicating the right turn is displayed on the second display screen portion 7g. This enables the driver to see the mark 16 at a position of the second virtual image 7j in front of the position of the third virtual image 7i, like the mark 16 is approaching the driver, and can easily figure out the alarm-distance D in three dimensions.

Then, the steps S3 to S5 are repeated until the alarm-distance D becomes 20 m. When the alarm-distance D becomes 20 m (D1 of the table of FIG. 5), the multistage display control unit 6 judges whether or not the turn-signal-lever is operated as shown in the step S9. If the lever is operated, the value of i is set to zero as shown in the step S8, the navigation arrow-mark 16 is erased as shown in steps S3 and S11.

Therefore, the driver can concentrate his or her attention upon confirming safety at surrounding circumstance of the turn position and driving operation of the steering, brake, and the like when the driver turns the vehicle, because of lack of continuously displaying the mark 16 during the turn.

In this embodiment, the alarm display system 100 has the operation-information storage unit 5 for providing the historical operation data including information on a driver's inherent driving skill and driving inclination, the multistage display control unit 6 can determine appropriate display and no-display of a navigation arrow-mark by allowing the data when the turn-signal-lever is operated.

On the other hand, when the lever is not operated near the turn position, the navigation arrow-mark 16 for indicating the right turn is displayed on the first display screen portion 7f for a predetermined period. This display of the mark 16 is emphasized by blinking of the mark 16 and/or changing its color. This emphasis of the mark 16 can provide the driver with quick notice of the mark 16, decreasing possibility of missing the turn point to be turned.

As described above, the multistage display control unit 6 controls the multistage display by linking it to the alarm-distance between the preset vehicle-position and the turn position.

The alarm display system 100 has the following advantages.

The system 100 has the LCD 7a with three display screen portions 7f to 7h, the two inclined half mirrors 7c and 7d, the inclined full mirror 7e, the multistage display control unit 6 for shifting display of a navigation arrow-mark on the first to third display screen portions 7f to 7h, which enables a driver to see the mark as a deep display image such that the alarm-distance which changes temporally can be displayed in three dimensions by moving the navigation arrow-mark in the longitudinal direction of the vehicle. Therefore, the driver can easily notice the turn position and its alarm-distance with perspective.

The system 100 is also equipped with the vehicle-information obtaining unit 4 for providing the driver-operation information, such as information on turn-signal-lever operation and/or brake-pedal operation, and when the multistage display control unit 6 detects at least one of the above operations, display of the navigation arrow-mark is erased to remove excess alarm display because of driver's notice of the turn position.

In addition, when the multistage display control unit 6 does not detect at least one of the above operations near the turn position, within the distance D1 of the table shown in FIG. 5 for instance, the navigation arrow-mark 16 is displayed with emphasis on its blinking and/or its changing color. This enables the driver to surely notice the turn position.

The system 100 further includes the operation-information storage unit 5 for storing the historical operation data of the driver, and the multistage display control unit 6 judges a driver's notice of the turn position with allowing the data from the storage unit 5. This enables the driver to have appropriate alarm display for a driver who has his or her inherent driving skill and driving inclination.

Next, an alarm display system for vehicles of a second embodiment according to the present invention.

In this embodiment, the system provides a vehicle-stop mark (NB) as an alarm display for indicating stop at a crossing place, an intersection, and the like, although the system 100 of the first embodiment provides the navigation arrow-mark. Therefore, an alarm object is a stop position (Ps) for a vehicle to stop next and an alarm-distance (D) is a distance between a present vehicle-position (Pp) and the stop position.

This system has a construction similar to that of the first embodiment shown in FIGS. 1 and 2.

Figure 6:
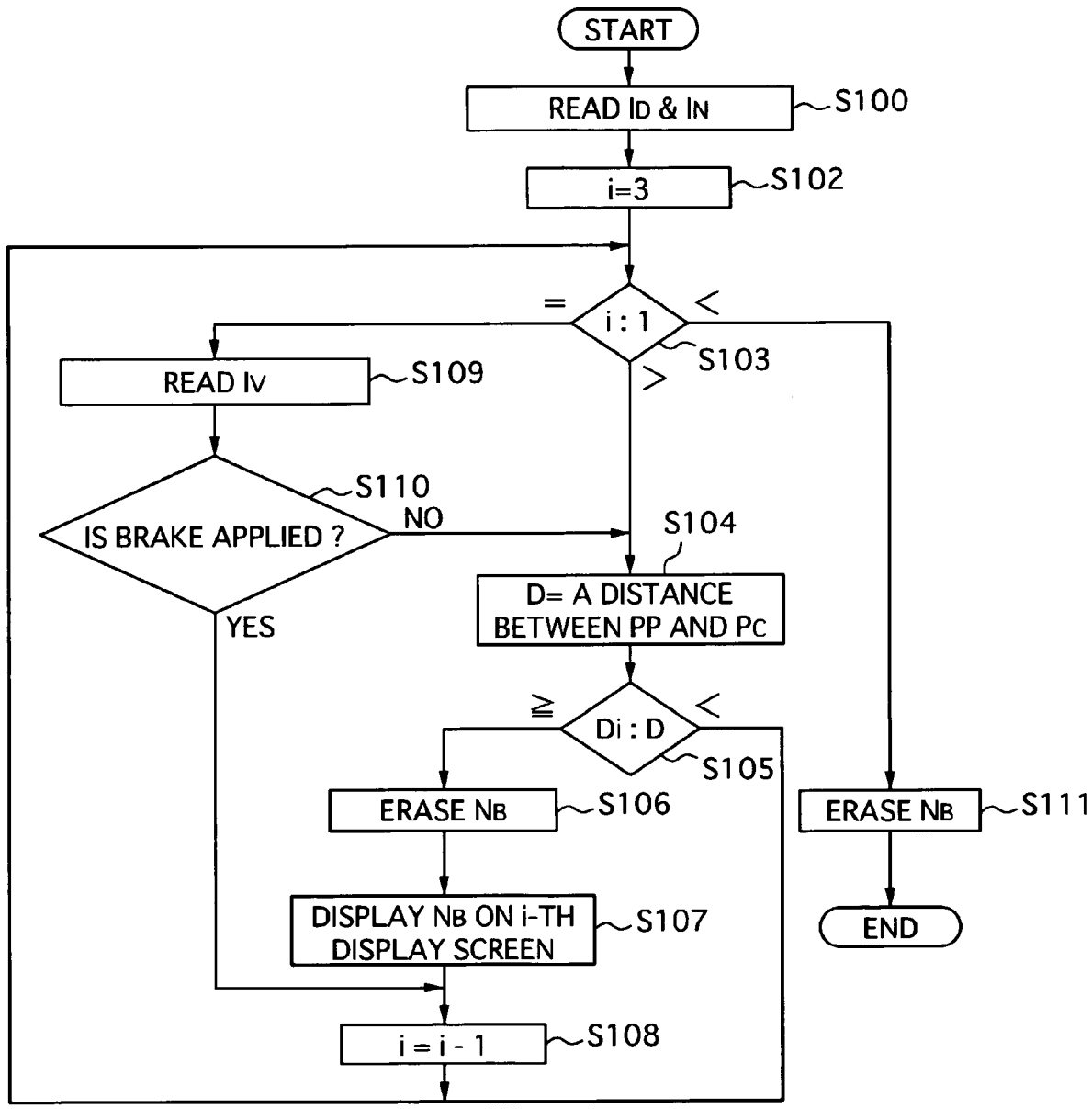
FIG. 6 is a flowchart of multistage display control, allowing for an operation of a brake pedal, executed by an alarm display system of a second embodiment according to the present invention.

FIG. 6 shows a flowchart of a multistage display control executed in the alarm display system of the second embodiment.

At step S100, an image processing unit detects an alarm-distance between a present vehicle-position of the vehicle and a stop position for the vehicle to stop next on by using a CCD stereo camera with obtaining a vehicle-stop mark indicating stop of the vehicle at the stop position, and the multistage display unit obtains information I$_D$ of the alarm-distance and information I$_N$ of the navigation arrow-mark. Then, the flow goes to step S102.

At the step S102, the multistage display control unit sets i, the number of display screen portions of an LCD, to have a value of three, and then the flow goes to step 103.

At the step S103, the control unit compares a value of i with one. If the value of i exceeds one, the flow goes to step S104, if the value of i is equal to one, the flow goes to step S109, and if the value of i is less than one, the flow goes to step S111.

At the step S104, a value of D is set to be the alarm-distance between a present vehicle-position and a stop position as a position of an alarm object, and then the flow goes to step S105.

At the step S105, a value of Di and a value of the D are compared to each other, where Di is a threshold value for determining an alarm-distance to display a vehicle-stop mark on an i-th display screen portion of the LCD and set based on a table shown in FIG. 7 and driver-operation information outputted from an operation-information storage unit. This value of Di may set by a driver. At this step S105, if Di is less than D, the steps S103 to S105 are repeated, while, if Di is equal to or more than D, the flow goes to step S106.

At the step S106, a vehicle-stop mark displayed is erased when it is displayed on any one of the first to third display screen portions, and then the flow goes to step S107.

At the step S107, the stop mark obtained at step S100 is displayed on the i-th display screen portion of the LCD, and then the flow goes to step S108.

At the step S108, the value of i is replaced by "i−1", and then the flow returns to the step S103.

On the other hand, when the value of i is equal to one, the flow goes to the step S109, where the multistage display control unit receives a driver-operation signal and a vehicle-operation signal from the vehicle-information obtaining unit to obtain vehicle-operation information I$_V$ of brake-pedal operation, turn-signal-lever operation, vehicle-speed, and-engine speed, and then the flow goes to step S110.

At the step S110, the multistage display control unit judges whether or not a brake-pedal is operated. If YES, the flow goes to the step S108, while, if NO, the flow goes to the step S104.

When the value of i is less than one, the flow goes to step S111, where the stop mark is erased, and then a first control ends.

The operation of the alarm display system of the second embodiment will be described.

When a driver starts the vehicle, the image processing unit obtains an alarm-distance between the present vehicle-position and a stop position for a vehicle to stop next, by detecting a stop sign or a halt indicator, with producing a vehicle-stop mark.

The multistage display control unit obtains the alarm-distance and the stop mark as shown in the steps S101 of FIG. 6 and sets i=1 as shown in the step S102.

For example, if the alarm-distance D is 100 m, the steps S103 to S105 are repeated until the alarm-distance D becomes 70 m (D3 in the table of FIG. 7). When the alarm-distance D becomes 70 m, the stop mark is displayed on the third display screen portion, which enables the driver to see the mark at a position of a most-rear third virtual image.

Then, the steps S103 to S105 are repeated until the alarm-distance D becomes 40 m (D2 in the table of FIG. 5), and when it becomes 40 m, the stop mark on the third display screen portion 7h is erased and the similar stop mark is displayed on the second display screen portion. This enables the driver to see the mark at a position of a second virtual image in front of the position of the third virtual image, like the mark is approaching the driver, and can easily figure out the alarm-distance D in three dimensions.

Then, the steps S103 to S105 are repeated until the alarm-distance D becomes 20 m (D1 in the table of FIG. 7). When the alarm-distance D becomes 20 m, the multistage display control unit judges whether or not the brake-pedal is operated as shown in the step S109. If the pedal is operated, the value of i is set to zero as shown in the step S108, the stop mark is erased as shown in steps S103 and S111.

Therefore, the driver can concentrate his or her attention upon confirming safety at surrounding circumstance of the stop position and driving operation of the steering, brake, and the like when the driver stops the vehicle, because of lack of continuously displaying the mark during the stop.

In this embodiment, the alarm display system has an operation-information storage unit for providing historical operation data including information on a driver's inherent driving skill and driving inclination, the multistage display control unit can determine appropriate display and no-display of a vehicle-stop mark by allowing the data when the brake-pedal is operated.

On the other hand, when the pedal is not operated near the stop position, the stop mark is displayed on the first display screen portion for a predetermined period. This display of the mark is emphasized by blinking of the mark and/or changing its color. This emphasis of the mark can provide the driver with quick notice of the mark, decreasing possibility of failing the vehicle stop.

As described above, the multistage display control unit controls the multistage display by linking it to the alarm-distance between the preset vehicle-position and the stop position.

The alarm display system 100 has the following advantages.

The system has the LCD with three display screen portions, two inclined half mirrors, an inclined full mirror, the multistage display control unit for shifting display of a vehicle-stop mark on the first to third display screen portions, which enables a driver to see the mark as a deep display image such that the alarm-distance which changes temporally can be displayed in three dimensions by moving the stop mark in the longitudinal direction of the vehicle. Therefore, the driver can easily notice the stop position and its alarm-distance with perspective.

The system is also equipped with the vehicle-information obtaining unit for providing the driver-operation information, such as information on brake-pedal operation, and when the multistage display control unit detects the brake-pedal operation, display of the stop mark is erased to remove excess alarm display because of driver's notice of the stop position.

In addition, when the multistage display control unit does not detect the brake-pedal operation near the stop position, within the distance D1 of the table shown in FIG. 7 for instance, the stop mark is displayed with emphasis on its blinking and/or its changing color. This enables the driver to surely notice the stop position.

The system further includes an operation-information storage unit for storing historical operation data of the driver, and the multistage display control unit judges a driver's notice of the stop position with allowing the data from the storage unit. This enables the driver to have appropriate alarm display for a driver who has his or her inherent driving skill and driving inclination.

While there have been particularly shown and described with reference to preferred embodiments thereof, it will be understood that various modifications may be made therein, and it is intended to cover in the appended claims all such modifications as fall within the true spirit and scope of the invention.

For example, an alarm object and an alarm display are not limited to the ones used in the embodiments, and they may be set arbitrarily.

Shifting order of an alarm display may be reversed against that of the embodiments, which enables a driver to see like a mark is going away.

The numbers of the display screen portions, half mirrors, and full mirrors may be set to have different numbers of the embodiments so as to obtain two-stage display or more-than-three-stage display.

The display screen portions may be placed to be turn down or in an inclined state.

The entire contents of Japanese Patent Application No. 2004-262925 filed Sep. 9, 2004 is incorporated herein by reference.

What is claimed is:

1. An alarm display system for vehicles comprising:
a panel display unit that has a plurality of display screen portions arranged along a longitudinal direction of a vehicle body and is capable of providing an alarm display on a screen of the display screen portions;
a multistage display unit having a plurality of reflecting mirrors that are inclined with respect to the display screen portions and arranged at intervals along the longitudinal direction so as to respectively correspond with the display screen portions and be capable of reflecting the alarm display, the reflecting mirrors including a rear-most reflecting mirror and at least one front reflecting mirror through which the alarm display can be seen;
an alarm-distance obtaining unit that obtains an alarm-distance between a present vehicle-position and a position of an alarm object; and
a multistage display control unit that controls the multistage display unit such that the alarm display is provided in order of the display screen portions thereon, being linked to the alarm-distance so as to obtain a deep multistage alarm display.

2. An alarm display system according to claim 1, wherein the alarm object is a turn position for a vehicle to turn next.

3. An alarm display system according to claim 2, wherein the alarm display includes a navigation arrow-mark for indicating a turn direction for the vehicle to turn next.

4. An alarm display system according to claim 1, wherein the alarm object is a stop position for a vehicle to stop next.

5. An alarm display system according to claim 4, wherein the alarm display includes a vehicle-stop mark.

6. An alarm display system according to claim 1, further comprising
a vehicle-information obtaining unit that obtains driver-operation information including at least one of brake-pedal-operation information and turn-signal-lever-operation information, wherein
the multistage display control unit controls the multistage display unit to erase the alarm display when the multistage display control unit judges, based on driver-operation information, that at least one of brake-pedal and turn-signal-lever is operated.

7. An alarm display system according to claim 6, wherein the alarm object is a turn position for a vehicle to turn next.

8. An alarm display system according to claim 7, wherein the alarm display includes a navigation arrow-mark for indicating a turn direction for the vehicle to turn next.

9. An alarm display system according to claim 6, wherein the alarm object is a stop position for a vehicle to stop next.

10. An alarm display system according to claim 1, further comprising
an operation-information storage unit that stores driver's operation information, wherein
the multistage display control unit controls the multistage display unit such that the alarm display is emphasized when the multistage display control unit judges, based on the driver's operation information, that a driver fails to notice the alarm display.

11. An alarm display system according to claim 10, wherein
the driver's operation information includes historical operation data of a driver.

12. An alarm display system according to claim 11, wherein
the driver's operation information includes data on a driver's inherent driving skill and driving inclination.

13. An alarm display device according to claim 10, wherein
the driver's operation information includes data on a driver's inherent driving skill and driving inclination.

14. An alarm display device according to claim 10, wherein
the alarm display is emphasized by at least blinking and changing color of the alarm display.

15. An alarm display system according to claim 10, wherein
the alarm object is a turn position for a vehicle to turn next.

16. An alarm display system according to claim 15, wherein
the alarm display includes a navigation arrow-mark for indicating a turn direction for the vehicle to turn next.

17. An alarm display system according to claim 10, wherein
the alarm object is a stop position for a vehicle to stop next.

18. An alarm display system according to claim 17, wherein
the alarm display includes a vehicle-stop mark.

* * * * *